United States Patent
Theiss

(10) Patent No.: US 11,448,247 B2
(45) Date of Patent: Sep. 20, 2022

(54) MODULAR CLAMPING SYSTEM FOR LINES OF DIFFERING DIAMETER AND CLAMPING PART THEREOF

(71) Applicant: igus GmbH, Cologne (DE)

(72) Inventor: Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 34 days.

(21) Appl. No.: 16/757,019

(22) PCT Filed: Oct. 16, 2018

(86) PCT No.: PCT/EP2018/078305
§ 371 (c)(1),
(2) Date: Mar. 30, 2021

(87) PCT Pub. No.: WO2019/076935
PCT Pub. Date: Apr. 25, 2019

(65) Prior Publication Data
US 2021/0372443 A1    Dec. 2, 2021

(30) Foreign Application Priority Data

Oct. 18, 2017 (DE) ...................... 20 2017 106 320.8

(51) Int. Cl.
*F16B 2/06* (2006.01)
*F16L 3/22* (2006.01)
*H02G 3/32* (2006.01)

(52) U.S. Cl.
CPC ................ *F16B 2/06* (2013.01); *F16L 3/222* (2013.01); *H02G 3/32* (2013.01)

(58) Field of Classification Search
CPC ..... F16B 2/06; F16L 3/222; F16L 3/22; F16L 3/221; F16L 3/10; F16L 3/1091;
(Continued)

(56) References Cited

U.S. PATENT DOCUMENTS

| 5,821,469 A | 10/1998 | Shanmugham | |
| 6,378,813 B1 * | 4/2002 | Gretz | F16L 3/222 |
| | | | 248/68.1 |
| 7,097,142 B1 * | 8/2006 | Schmidt | H02G 3/30 |
| | | | 248/68.1 |
| 8,807,492 B2 * | 8/2014 | Lake | F16L 1/0246 |
| | | | 248/65 |

(Continued)

FOREIGN PATENT DOCUMENTS

| DE | 932190 | 8/1955 |
| DE | 102014001161 | 8/2015 |

(Continued)

OTHER PUBLICATIONS

Machine translation of WO 00/63600.*
(Continued)

*Primary Examiner* — Christopher Garft
(74) *Attorney, Agent, or Firm* — Grossman, Tucker, Perreault & Pfleger, PLLC

(57) ABSTRACT

The invention relates to a modular clamping system for fixing a plurality of supply lines, for example, for tension relief in energy chains, and to a clamping part therefor. A plurality of identical clamping parts are stackable one atop the other and hold to each other, wherein each clamping part has a first clamping jaw having a clamping surface and a second opposite clamping jaw facing away, having a clamping surface. A receiving channel for a line that is to be fixed is delimited between the clamping surfaces of facing clamping jaws. According to the invention, in each clamping part, at least the first clamping jaw forms at least one recess, in which a second clamping jaw of a following, identical clamping part can penetrate, crosswise to the lead-through direction of the lines, wherein the free cross-section of the receiving channel is reduced further compared to a non-penetrating position.

19 Claims, 2 Drawing Sheets

(58) Field of Classification Search
CPC ......... F16L 3/1025; F16L 3/1008; F16L 3/08; H02G 3/32; H02G 3/30
USPC .......................................................... 248/49
See application file for complete search history.

(56) References Cited

U.S. PATENT DOCUMENTS

2003/0089829 A1* 5/2003 Brandzel ................. F16L 3/222
                                                          248/68.1
2005/0006535 A1    1/2005 Brown et al.

FOREIGN PATENT DOCUMENTS

EP          2782200          9/2014
WO          00/63600         10/2000

OTHER PUBLICATIONS

International Search Report from corresponding PCT Appln. No. PCT/EP2018/078305, dated Jan. 23, 2019.
Written Opinion from corresponding PCT Appln. No. PCT/EP2018/078305, dated Jan. 23, 2019.
Te Connectivity. "Tyco Electronics Raychem BVBA Files Patent Application for Cable 1-3.7.13.15.16 Fixation Bracket" Indian Patent News, Mar. 3, 2015 (Mar. 3, 2015), Retrieved from the Internet: https://www.te.com/commerce/DocumentDelivery ID DE Co ntroller? Action=showdoc&DocId=Catalog +Section% 7FEPP-221 I-AU-5-15%7FI %7Fpdf%7FEnglish%7FENG_CS_EPP-22II-AU-5-15_1.pdf%7FBM4873-000 [retrieved on Dec. 3, 2018] XP055529480 pp. 2,4,5,7.

* cited by examiner

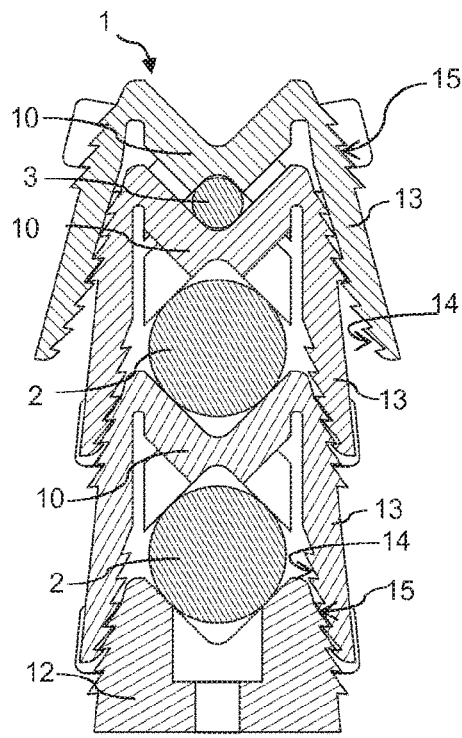 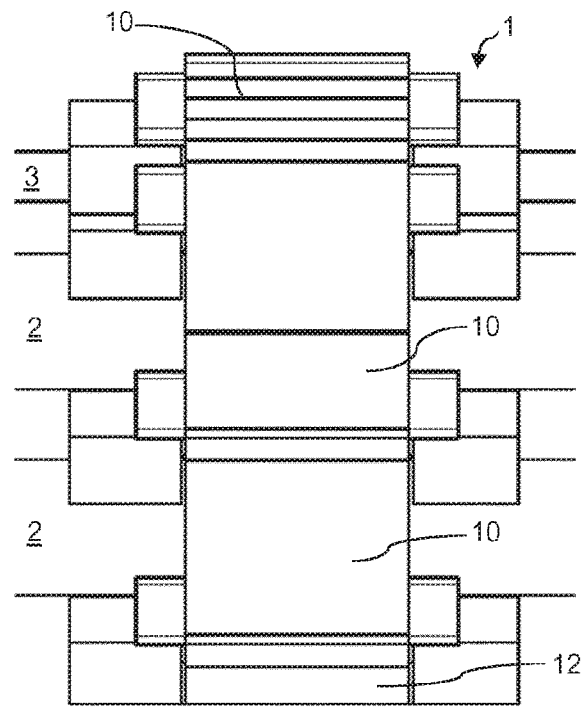
FIG.1A  FIG.1B
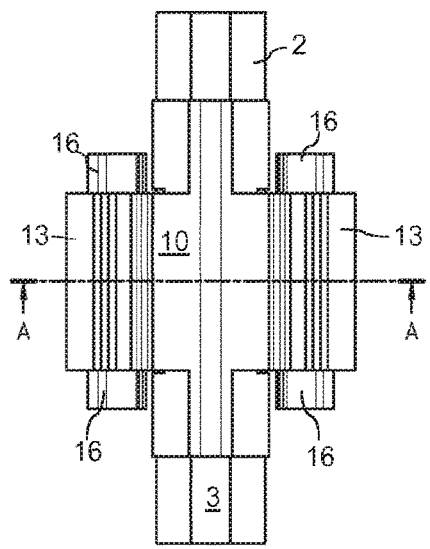 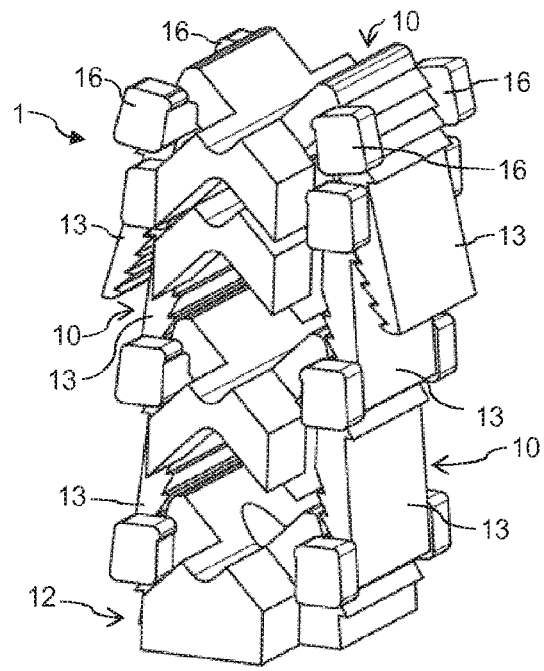
FIG.1C  FIG.1D

MODULAR CLAMPING SYSTEM FOR LINES OF DIFFERING DIAMETER AND CLAMPING PART THEREOF

FIELD

The invention generally relates to a clamping system or a clamping part for fixing supply lines, in particular for tension relief. Two clamping parts can be connected to one another and interact in a holding manner with respect to a lead-through direction. One clamping part comprises a first clamping jaw having a clamping surface and the other clamping part comprises a second clamping jaw having a clamping surface, the clamping parts defining a receiving channel for a line to be fixed. The receiving channel extends in the lead-through direction between the clamping surfaces of the facing clamping jaws. The invention also relates to a modular clamping system comprising a plurality of identical clamping parts which are stackable on top of each other, and to a corresponding clamping part having two clamping jaws that face away from each other.

BACKGROUND

A generic clamping system is known from WO 00/63600 A1. This solution has proven itself in practice and offers in particular a modular design in which a lower part and several clamping parts are stacked on top of each other as required and form a clamp for tension relief for several lines. However, the specified concave clamping surfaces are only suitable for a limited range of line diameters so that a number of different components must be manufactured and kept in stock in order to be able to fix lines with different diameters.

A different, non-generic clamp for fixing supply lines of different diameters is pre-known from DE 10 2014 001 161 A1. This clamp comprises two differently designed clamp parts, namely a receiving part having several receptacles for lines of increasing diameter, and a holder. The receiving part and the holder can be connected to each other and interact in a holding manner with respect to a lead-through direction. The receiving part forms several clamping surfaces, and the holder forms one clamping surface, and between the facing clamping surfaces a receiving channel which extends in the lead-through direction is defined for one or even several lines to be fixed. The holder forms two lateral recesses into which lateral legs of the receiving part can penetrate so as to adjust the free cross-section of the receiving channel.

A disadvantage of the solution described in DE 10 2014 001 161 A1 is among other things a lack of modularity, because such a clamp can only fix several lines of various diameters in a secure manner, which means that several such clamps are required for fixing several lines of the same diameter. Another disadvantage is the fixed minimum construction height and the inherently limited tensile strength if several lines are held.

SUMMARY

Accordingly, it is an object of the present invention to further develop a modular clamping system of the type described in WO 00/63600 A1 to that effect that several lines within a predetermined range of line diameters can be fixed with a smaller number of differently dimensioned clamping parts or that the number of the individual parts which are required can be reduced. Further, it shall be possible to achieve a tensile strength which is increased compared to DE 10 2014 001 161 A1, independently of the line diameter.

In a clamping system, according to the invention, it is provided that at least the first clamping jaw of each clamping part forms at least one recess into which the second clamping jaw of a subsequent part or clamping part can penetrate transversely to the lead-through direction, thus further reducing the free cross-section of the receiving channel compared to the corresponding cross-section in a non-penetrating position.

Therefore according to the invention, a clamping part comprises a first clamping jaw and an opposite second clamping jaw that faces away, which clamping jaws are designed to interact in conjugation, and wherein, according to the invention, the first clamping jaw of the clamping part in question forms at least one recess into which the second clamping jaw of an identically designed further clamping part can penetrate transversely to the lead-through direction in order to further reduce the free cross-section of the receiving channel when compared to a non-penetrating position or compared to the corresponding cross-section in a non-penetrating position.

Accordingly, the central idea of the invention is that the clamping jaws which are designed in a conjugate manner are configured in such a way that one clamping jaw can plunge or penetrate into the other clamping jaw at least partially. In this manner, the free cross-section or opening diameter can be further reduced compared to a position where the clamping jaws merely rest on each other. In addition, this allows opposite clamping jaws to interact in such a way that their respective clamping surfaces mesh with one another or partly interlock or penetrate each other and/or are nested within each other when penetrating or plunging one into the other. On the one hand, this allows a wider range of line diameters to be clamped or trapped and, at the same time, provides additional protection against a tensile force, i.e. in the longitudinal or lead-through direction of the line. Furthermore, it is possible to achieve an improved clamping effect at the elastic sheathing a line to be fixed is usually provided with.

The proposed clamping system is generally suitable as tensioning, holding or clamping device for lines, in particular for cables and hoses, and especially as relief in any application.

The one or more recesses in the first clamping jaw can be arranged to be breaking through with respect to a boundary layer adjacent to the clamping surface and imaginarily continuous in the lead-through direction and having an identical cross-section at this clamping jaw.

For this purpose, a preferred embodiment with interlocking effect provides that the first clamping jaw has a first section, an opposite second section aligned in the lead-through direction, and a narrow mid-section therebetween, with a respective recess provided between the two sections on both sides of the narrow section. A lateral section of the conjugate second clamping jaw, in particular of an identically designed clamping part, can penetrate correspondingly into each of these recesses in order to achieve a nested or interlocking configuration that reduces the opening cross-section.

Said one or more recess(es) in the first clamping jaw can be delimited in the lead-through direction by opposite end faces which are perpendicular to this clamping jaw. This allows abutments, in particular planar abutment surfaces which are also perpendicular and which interact with the said end faces, to be arranged in the second clamping jaw in order to further improve the tensile strength.

Preferably, the clamping surfaces have a concave design on both clamping jaws. A generally cylindrical shape, e.g. a prismatic shape, is preferred in this case.

In a preferred embodiment, the clamping surfaces are designed with a substantially V-shaped cross-section perpendicular to the lead-through direction to always achieve approximately the same clamping force independently of the line cross-section. A concavely curved shape, e.g. with an approximately oval cross-section, is less preferable here, but is also within the scope of the invention.

The clamping surfaces each comprise two planar or flat clamping flanks which are preferably arranged or converge at right angles or at an obtuse angle to each other. Particularly preferably, a continuously concavely curved mid-surface is provided between the clamping flanks so that even the smallest line cross-sections, which are not in contact with the clamping flanks, can be clamped in a tension-resistant manner by means of these mid-surfaces.

For a good distribution of the tension force to the line, the clamping surface of the first clamping jaw can be designed mirror-symmetrically in cross-section to the conjugate clamping surface of the second clamping jaw, i.e. the concave cross-sections of the clamping surface can be mirror-symmetrical with respect to a longitudinal central plane of a clamping part.

The clamping jaws, if designed according to the invention, can have conjugate clamping surfaces in such a way that, in a first non-penetrating position, a line having a diameter ≥18 mm can be received and fixed in the receiving channel and, in a penetrating position with a reduced, in particular minimum possible diameter of the receiving channel, a line having a diameter ≤6 mm can be received and fixed in the receiving channel. In this manner, lines having a diameter varying by a factor of ≥3 can be fixed using a same clamping part (=identical part).

Relatively sharp-edged transitions, especially edges which are perpendicular to each other, can be provided between the end faces defining the recess(es) in the lead-through direction and the effective clamping surfaces (i.e. the imaginary clamping surface without the breakthrough area of the recess) on the first clamping jaw to cause a pinching effect at the line sheath, i.e. to ensure that the line is clamped highly resistant to tension even with a lower clamping force.

Preferably, the clamping parts can be plug-fitted one on top of the other, in particular stacked in a modular fashion. For this purpose, all the clamping parts which are provided can have modular locking means. These locking means can be designed in such a way that, if necessary, also different clamping parts can be firmly locked together and thus fixed to each other transversely to the lead-through direction without tools. In one embodiment, in which locking means are provided, at least one clamping part has outwardly inclined resilient legs with toothed strips on the inner side. Each clamping part, hence also the interacting other clamping part, further has corresponding outwardly inclined outer surfaces with opposite toothed strips on the outer side.

In an alternative embodiment, optionally without an interlocking design for generating the clamping force, the clamping parts can, for example, be mounted on a guide so as to be displaceable transversely to the lead-trough direction and can be pre-loaded against each other by a suitable device, in particular by a resilient tensioning device, such as a tension spring.

The proposed clamping system makes it possible, among other things, to fix at least two lines with different or identical line diameters using one clamp. For this purpose, the clamp is constructed from two identical clamping parts and one additional clamping part that is designed as a lower part with means for anchoring, in particular to a C-profile and/or a crossbar of an energy chain. According to the invention, the structure is modularly scalable, i.e. a number n of clamping parts on a lower part can securely fix a corresponding number n of lines, regardless of the line diameter.

Preferably all clamping parts are made of a thermoplastic material. A system with only two or three component types, at least one lower part and at least one actual clamping part reduces the tooling costs during production, e.g. in injection molding, and makes stock keeping easier.

The invention is particularly suitable as tension relief for several supply lines at the end fastening part of an energy chain. Accordingly, it also relates to an energy chain with two end fastening parts, at least one end fastening part having a device used as tension relief according to one of the above described embodiments.

BRIEF DESCRIPTION OF THE DRAWINGS

Further details, features and advantages of the invention will become apparent from the following detailed description of a preferred embodiment with reference to the attached drawings wherein it is shown by:

FIGS. 1A-1D show an exemplary arrangement using the modular clamping system comprising three identically designed clamping parts and one lower part which together form a clamp for three lines, shown in cross-section (FIG. 1A) corresponding to the section line A-A of the plan view (FIG. 1C), and in a lateral view (FIG. 1B) and in a perspective view without clamped lines (FIG. 1D);

DETAILED DESCRIPTION OF THE DRAWINGS

Figure 2A:
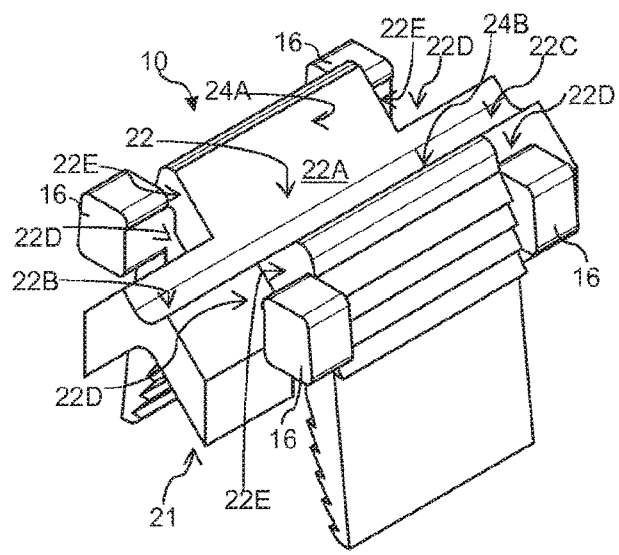
FIGS. 2A-2B are perspective views of the clamping part usable in a modular fashion diagonally from above (FIG. 2A) and diagonally from below (FIG. 2B)

FIGS. 1A-1D show a vertically stacked structure 1 consisting of three identical clamping parts 10 and a lower part 12, which are plugged together in a clip-like manner, as one example of use as a clamp or a tension relief. This exemplary module structure can accommodate three lines 2, 3, wherein two lines with identical line diameter and a further line 3 with a significantly smaller diameter (approximately by a factor of 3) are shown here for illustration purposes.

For mutual fastening to one another, the clamping parts 10 have resilient legs 13 which are symmetrically inclined outwards on both sides, each with an inner toothed strip 14 and an outer toothed strip 15 with opposing teeth which interact in a latching manner to ensure gradual latching in a direction perpendicular to the lead-through direction (see plane from FIG. 1A). In this respect, the teaching of WO 00/63600 A1 is incorporated herein for reference to shorten the present description. The lower part 12, on the other hand, only has an outer toothed strip 15 on sloping side walls identical to those of the clamping parts 10. For additional securing in the longitudinal or guide-through direction of the lines 2, 3, two laterally projecting, holding blocks 6 are molded to the end face of each leg 13 between which the end faces of the legs 13 of an attached clamping part 10 are held. By means of the resilient legs 13, the toothed strips 14, 15 also allow the lines 2, 3 to be clamped without tools by locking them at the appropriate locking step.

Figure 2B:
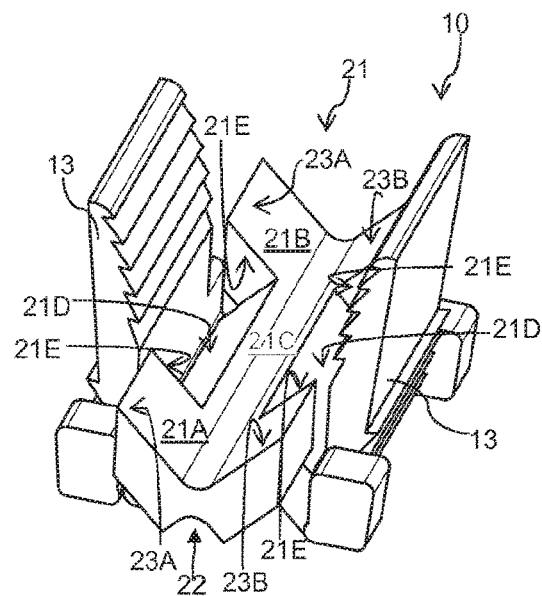

From FIG. 2A-2B the construction of a clamping part 10 can be seen more closely. Each clamping part 10 forms a first clamping jaw 21 on the underside with a clamping surface consisting of a concave first section 21A, a second concave section 21B opposite and aligned with it in the lead-through direction, and a concave narrow mid-section 21C in between. The surfaces of the sections 21A, 21B and the narrow section 21C are approximately prismatic and, for example, generated by a line which follows an approximately V-shaped cross-section (see FIG. 1A/FIG. 3A). The boundary surface of the clamping jaw 21 generated or imagined in this way is, as illustrated in FIG. 2B, interrupted by two recesses 21D which are provided in the longitudinal direction between the two sections 21A, 21B and in the transverse direction on both sides along the narrow section 21C and extend up to the legs 13. Each of the sections 21A, 21B comprises two plane clamping flanks 23A, 23B, which are approximately at right angles to each other. Between the clamping flanks 23A, 23B, a continuously concavely curved mid-surface 23C is provided here, which continues over the sections 21A, 21B and the narrow section 21C in the lead-through direction.

On the upper side that faces away, each clamping part 10 forms a second clamping jaw 22 conjugate to the first clamping jaw which serves as a support for a line 2, 3.

As can be seen in FIG. 2A, the second clamping jaw 22 here has a clamping surface consisting of a concave central main surface 22A and two opposite smaller concave narrow surfaces 22B, 22C projecting at the front. The surfaces 22A, 22B, 22C of the second clamping jaw 22 are also generated by a line following an approximately V-shaped cross-section (see FIG. 1A/FIG. 3A) that is preferably identical but mirror-symmetrical to that of the clamping surfaces on the first jaw 21. The main surface 22A of the second clamping jaw 22 has two clamping flanks 24A, 24B, which, analogous to the clamping flanks 23A, 23B, are designed in a planar fashion with their end faces at approximately right angles to each other. Between the clamping flanks 24A, 24B there is also a connecting mid-surface 24C having a continuously concavely curved cross-section (see FIG. 3A) and extended at the end face in the lead-through direction by the narrow surfaces 22B, 22C. As can be seen further in FIG. 2, additional recesses 22D are provided on the upper side of the second clamping jaw 22 in the corner areas between the holding blocks 16 and the projections which form the narrow surfaces 22B, 22C and, on the rear side, the sections 21A, 21B, mirror-symmetrical to the longitudinal and transverse plane.

By means of the opposite mid-surfaces 23C, 24C, lines 3 with smaller diameters (see FIG. 1A above) can be clamped. The clamping flanks 23A, 23B or 24A, 24B, on the other hand, are used to clamp cables 2 with a larger diameter (see FIG. 1A in the middle/at the bottom).

Figure 3A:
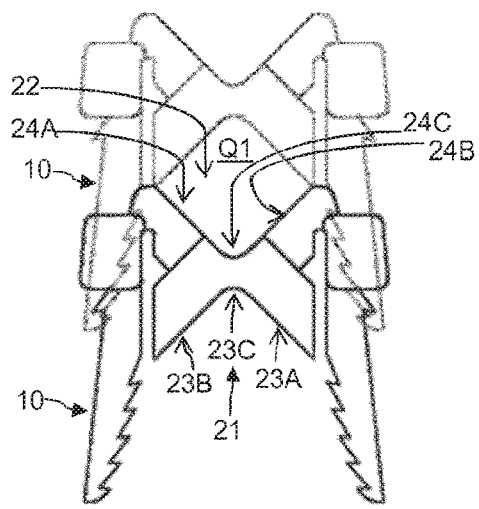
FIGS. 3A-3B are front views of the clamping part in FIG. 2A-2B for illustrating a non-penetrating position with minimum free cross-section (FIG. 2A) and compared thereto with a reduced, in this case minimum possible free cross-section for a line to be clamped (FIG. 2B) in a completely penetrating position of a further identical clamping part shown hatched.
Figure 3B:
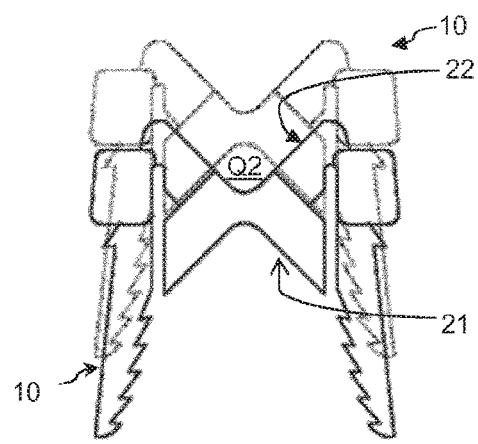

FIG. 3A shows for illustration purposes a position of two clamping parts 10 plugged on top of each other, in which the clamping flanks 23A, 23B or 24A, 24B of the opposing clamping jaws 21 or 22 are only adjacent to each other and a free cross-section Q1 is left, which has a medium size compared to the larger cross-section for the lines 2 in FIG. 1A. In contrast, FIG. 3B shows a significantly reduced, minimum possible free cross-section Q2 for the intended smallest line diameter.

In particular through the recesses 21D, an attached clamping part 10 (shown hatched in FIG. 3A-3B) can be further inserted against the clamping part 10 below at right angles to the lead-through direction, since the projecting regions of the second clamping jaw 22 on the lower clamping part 10, in particular the clamping flanks 24A, 24B, can penetrate or plunge into the recesses 21D in order to further reduce the free cross-section of the receiving channel compared to a non-penetrating position, e.g. with a cross-section Q1, down to the minimum cross-section Q2. In the example shown here, the bottom-side clamping flanks 23A, 23B of the two sections 21A, 21B of the first clamping jaw 21 on the upper clamping part 10 also penetrate into the corner-side recesses 22D on the upper-side second clamping jaw 22 on the lower clamping part 10. This enables a minimum free cross-section Q2 (FIG. 3) and at the same time achieves a kind of interlocking or nesting of the cooperating opposing clamping jaws 21, 22, which further improves the tensile strength of the plug connection.

Inner end faces 21E provided on the first clamping jaw 21 which limit the receptacles 21D in the lead-through direction and interact with corresponding end abutment surfaces 22E of the second clamping jaw 22, contribute to this.

Between the end faces 21E and the flat surfaces of the two sections 21A, 21B, the clamping jaw 21 forms transition edges, here approximately at right angles, which—depending on the gap width between the end faces 21E and abutment surfaces 22E—can cause slight pinching or tilting of the sheathing of the lines 2, 3 and thus improve the fastening in the longitudinal direction of the cables 2, 3 if necessary. The same applies to the transition edges between the abutment surfaces 22E and the flat surfaces on the flanks 24A, 24B of the clamping jaw 22.

Figure 4A:
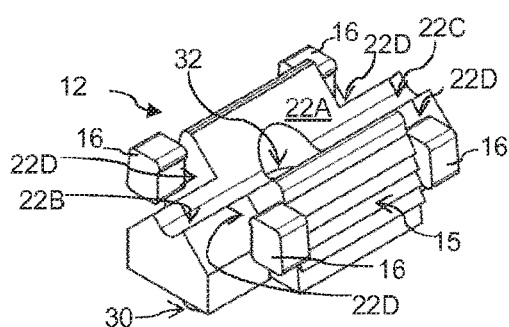
FIGS. 4A-4B are a perspective and a front view of the lower part in FIG. 1A-1D.
Figure 4B:
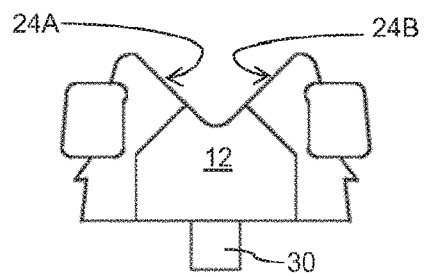

FIG. 4A-4B show the differently designed lower part 12, which has only one clamping jaw 22 on the upper side, which is essentially identical in design to the clamping jaw 22 on the clamping part 10 in order to interact with the conjugate clamping jaw 21 on the lower side of an attached clamping part 10 (see FIG. 1A-1D). Accordingly, compared to the clamping part 10, the lower part 12 has a main surface 22A with two clamping flanks 24A, 24B, two axially projecting narrow surfaces 22B, 22C as well as corner recesses 22D between the holding blocks 16 and the narrow surfaces 22B, 22C. The lower part 12 is designed with two protruding locking pins 30 to prevent rotation, for example on a mounting rail or the like, if the bottom part is attached to a support by means of a screw connection through the central screw opening 32. The clamping parts 10 and the lower part 12 according to FIG. 1-4 are designed symmetrically with respect to the vertical longitudinal center plane so that the installation direction is not important in order to simplify the installation. Concerning the fastening to a support, the teaching of WO 00/63600 is herewith incorporated by reference for shortening the present description.

Finally, it should be noted that the lower clamping jaw is designated here as the first clamping jaw 21 and the upper clamping jaw of clamping part 10 as the second clamping jaw 22, but the designation also applies vice versa. Furthermore, it is of course also conceivable that the design of the jaws 21, 22 could be reversed.

The example shows that the clamping parts in accordance with the invention can be used in a modular fashion and very flexibly according to the most varied requirements, especially for the construction of clamps in general, and of tension reliefs for energy chains in particular.

The system consists of only a small number of different parts, preferably only two components, namely a lower part and a single clamping part, both of which are suitable for inexpensive series production from plastic, e.g. as injection molded parts.

LIST OF REFERENCE SIGNS

FIG. 1A-4B 1 clamp (or clamping system)
2, 3 supply lines
10 clamping part
12 lower part
13 leg
14, 15 toothed strips
16 holding block
21 first clamping jaw
21A, 21B partial surfaces
21C narrow surface
21D recess
22 second clamping jaw
22A main surface
22B, 22C narrow surfaces
22D recess
23A, 23B clamping flanks (of first clamping jaw)
23C mid-surface (of first clamping jaw)
24A, 24B clamping flanks (of second clamping jaw)
24C mid-surface (of second clamping jaw)
30 locking pin
32 screw hole
Q1 free cross-section (medium-sized)
Q2 minimum free cross-section

What is claimed is:

1. A modular clamping system for fixing one or several supply lines, comprising:
    a plurality of identically configured clamping parts stackable one on top of another transversely to a lead-through direction and which interact in a holding manner, each clamping part of the plurality of identically configured clamping parts having a first clamping jaw with a first jaw clamping surface and, facing away therefrom, an opposite second clamping jaw with a second jaw clamping surface,
    wherein the first clamping jaw of each clamping part of the plurality of identically configured clamping parts is arrangeable with the second clamping jaw of each other clamping part of the plurality of identically configured clamping parts to provide facing clamping jaws of two clamping parts,
    wherein the two clamping parts are arrangeable to define a receiving channel for a line fixable therein extending in the lead-through direction between the first and second jaw clamping surfaces of the facing clamping jaws, and
    wherein the first clamping jaw of one of the two clamping parts has at least one recess through its first jaw clamping surface, the recess being arranged to receive the second clamping jaw of another one of the two clamping parts penetrating transversely to the lead-through direction in order to reduce a cross-section of the receiving channel compared to a non-penetrating position.

2. The modular clamping system according to claim 1, wherein the at least one recess of the first clamping jaw are two recesses arranged to be breaking through with respect to the first jaw clamping surface.

3. The modular clamping system according to claim 1, wherein the at least one recess of the first clamping jaw is defined in the lead-through direction by opposite end faces which are perpendicular to the first jaw clamping surface, and the second clamping jaw has abutments that interact with the opposite end faces.

4. The modular clamping system according to claim 3, wherein sharp-edged ransitions, at right angles, are provided between the opposite end faces which define the recess in the lead-through direction and effective clamping surface of the first clamping jaw.

5. The modular clamping system according to claim 1, wherein the first and second jaw clamping surfaces have a concave shape and/or form a substantially V-shaped cross-section perpendicular to the lead-through direction.

6. The modular clamping system according to claim 5, wherein the first and second jaw clamping surfaces each have two planar clamping flanks arranged at an angle to each other.

7. The modular clamping system according to claim 1, wherein, in the non-penetrating position, a line having a diameter of ≥18 mm is receivable and fixable in the receiving channel, and wherein the second clamping jaw is penetrable into the at least one recess to reduce the cross-section of the receiving channel such that a line having a diameter of ≤6 mm is receivable and fixable in the receiving channel.

8. The modular clamping system according to claim 1, wherein the facing clamping jaws interact that their clamping surfaces mesh with each other.

9. The modular clamping system according to claim 1, wherein the two clamping parts are lockable together with an interlocking configuration which locks the clamping parts to each other transversely to the lead-through direction when stacked one on top of another.

10. The modular clamping system according to claim 9, wherein the interlocking configuration is provided by outwardly inclined resilient legs with toothed strips on an inner side of one of the two clamping parts, which lock with outwardly inclined outer surfaces with opposite toothed strips on an outer side of another one of the two clamping parts.

11. The modular clamping system according to claim 1, further comprising an additional clamping part which anchors the plurality of identically configured clamping parts when stacked one on top of another.

12. The modular clamping system according to claim 1, wherein the plurality of identically configured clamping parts are each made of a thermoplastic material.

13. The modular clamping system according to claim 1, wherein the modular clamping system provides a tension relief for the one or several supply lines.

14. The modular clamping system according to claim 1, wherein the modular clamping system is part of an energy chain.

15. The modular clamping system according to claim 2, wherein the first clamping jaw comprising a first section, a second section oppositely arranged the first section and aligned in the lead-through direction, and a narrow mid-section between the first section and the second section, and wherein the at least one recess further comprises a recess being provided between the first and second sections on each of two sides of the narrow section, respectively.

16. The modular clamping system according to claim 6, wherein a continuously concavely curved mid-surface is provided between the two planar clamping flanks of the first and second jaw clamping surfaces, respectively.

17. The modular clamping system according to claim 5, wherein the first jaw clamping surface of the first clamping jaw is designed mirror-symmetrical in cross-section to the second jaw clamping surface of the second clamping jaw.

18. Clamping parts for fixing one or several supply lines, comprising:
- a plurality of identically configured clamping parts each having a first clamping jaw with a first jaw clamping surface and, facing away therefrom, an opposite second clamping jaw with a second jaw clamping surface,
- wherein the first clamping jaw of each clamping part of the plurality of identically configured clamping parts is arrangeable with the second clamping jaw of each other clamping part of the plurality of identically configured clamping parts to provide facing clamping jaws of two clamping parts,
- wherein the two clamping parts are arrangeable to define a receiving channel for a line fixable therein extending in the lead-through direction between the first and second jaw clamping surfaces of the facing clamping jaws,
- wherein the first clamping jaw of one of the two clamping parts forms at least one recess into which the second clamping jaw of another one of the two clamping parts is penetrable transversely to the lead-through direction to reduce a cross-section of the receiving channel compared to a non-penetrating position,
- wherein the at least one recess of the first clamping jaw is arranged to be breaking through with respect to the first jaw clamping surface, and
- wherein the first clamping jaw comprising a first section, a second section oppositely arranged the first section and aligned in the lead-through direction, and a narrow mid-section between the first section and the second section, and wherein the at least one recess further comprises a recess being provided between the first and second sections on each of two sides of the narrow section, respectively.

19. A modular clamping system for fixing one or several supply lines, comprising:
- a plurality of identically configured clamping parts stackable one on top of another transversely to a lead-through direction and which interact in a holding manner, each clamping part of the plurality of identically configured clamping parts having a first clamping jaw with a first jaw clamping surface and, facing away therefrom, an opposite second clamping jaw with a second jaw clamping surface,
- wherein the first clamping jaw of each clamping part of the plurality of identically configured clamping parts is arrangeable with the second clamping jaw of each other clamping part of the plurality of identically configured clamping parts to provide facing clamping jaws of two clamping parts,
- wherein the two clamping parts are arrangeable to define a receiving channel for a line fixable therein extending in the lead-through direction between the first and second jaw clamping surfaces of the facing clamping jaws,
- wherein the first clamping jaw of one of the two clamping parts forms at least one recess into which the second clamping jaw of another one of the two clamping parts is penetrable transversely to the lead-through direction to reduce a cross-section of the receiving channel compared to a non-penetrating position, and
- wherein the at least one recess of the first clamping jaw is defined in the lead-through direction by opposite end faces which are perpendicular to the first jaw clamping surface, and the second clamping jaw has abutments that interact with the opposite end faces.

* * * * *